US007035994B2

(12) United States Patent
Tanaka et al.

(10) Patent No.: US 7,035,994 B2
(45) Date of Patent: Apr. 25, 2006

(54) STORAGE DEVICE, INFORMATION PROCESSING SYSTEM HAVING STORAGE DEVICE, FORMAT METHOD FOR STORAGE DEVICE, DATA RECORDING METHOD, AND PROGRAM FOR IMPLEMENTING FORMATTING AND DATA RECORDING

(75) Inventors: Nobuyoshi Tanaka, Machida (JP); Kiyoshi Nishino, Yokohama (JP); Akihiro Ogura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 10/454,141

(22) Filed: Jun. 3, 2003

(65) Prior Publication Data

US 2004/0010655 A1 Jan. 15, 2004

(30) Foreign Application Priority Data

Jun. 4, 2002 (JP) ............................ 2002-163020

(51) Int. Cl.
*G06F 12/00* (2006.01)

(52) U.S. Cl. ........................... 711/217; 711/170; 713/1

(58) Field of Classification Search ........ 711/170–172, 711/217, 221, 114; 710/8, 10, 30, 72–74, 710/62; 713/1, 2; 708/170

See application file for complete search history.

(56) References Cited

U.S. PATENT DOCUMENTS 5,812,883 A * 9/1998 Rao ............................ 710/74
5,920,733 A * 7/1999 Rao ............................ 710/68
6,198,876 B1 * 3/2001 Iwasaki et al. ............... 386/95

FOREIGN PATENT DOCUMENTS

JP 52-115636 9/1977
JP 02-018757 1/1990
JP 03-260956 11/1991
JP 06-075715 3/1994

OTHER PUBLICATIONS

T. W. Burger, Setting up a multi-boot machine with Linux and other operating system, Dec. 1, 2000, IBM DeveloperWorks, pp. 1-4.*

* cited by examiner

*Primary Examiner*—Donald Sparks
*Assistant Examiner*—Jared Rutz
(74) *Attorney, Agent, or Firm*—Timothy N. Ellis

(57) ABSTRACT

To provide a storage device capable of shortening a formatting time and a data recording time, and an information processing system, method and program. The storage device of the invention has at least one storage medium 40, storing means 32 for storing plural patterns of format data for each pattern, receiving means 34 for receiving a sector address specifying a sector of the storage medium 40 to be written and a pattern identifier specifying a pattern of the format data to be written, and writing means 36 for reading the format data having the pattern corresponding to the pattern identifier from the storing means 32 and writing the read format data into the sector of the storage medium 40 corresponding to the received sector address.

24 Claims, 15 Drawing Sheets

Start a command of writing data (address, pattern number, number of sectors) — 700

Receive the address, pattern number and number of sectors through the interface — 710

Read data corresponding to the pattern number from cache and write data at an address of disk — 720

Is data of addresses written by the number of sectors? — 730 (no → 740: Address = Address + 1; yes →)

End — 750

[Figure 1]
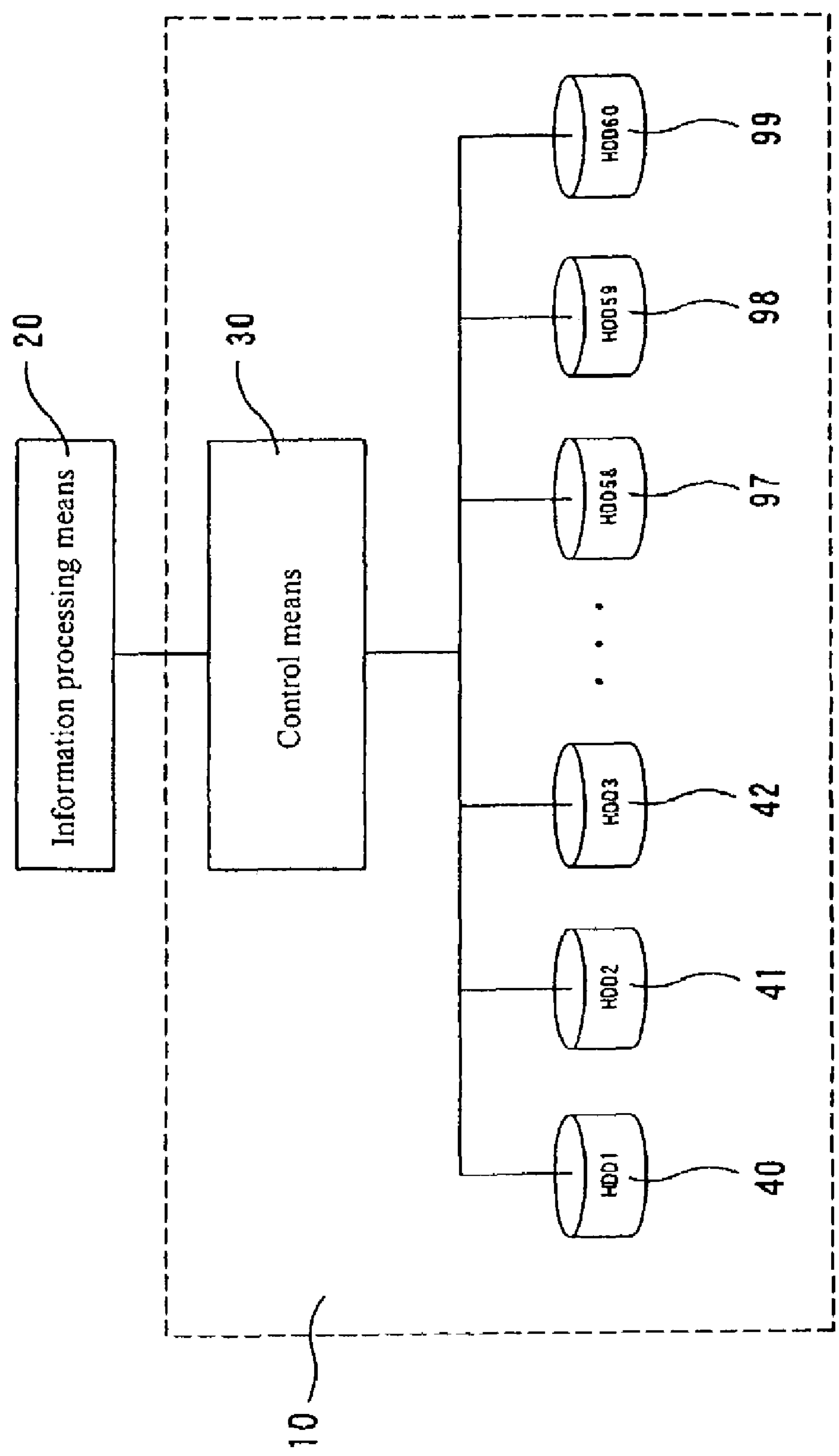

[Figure 2]
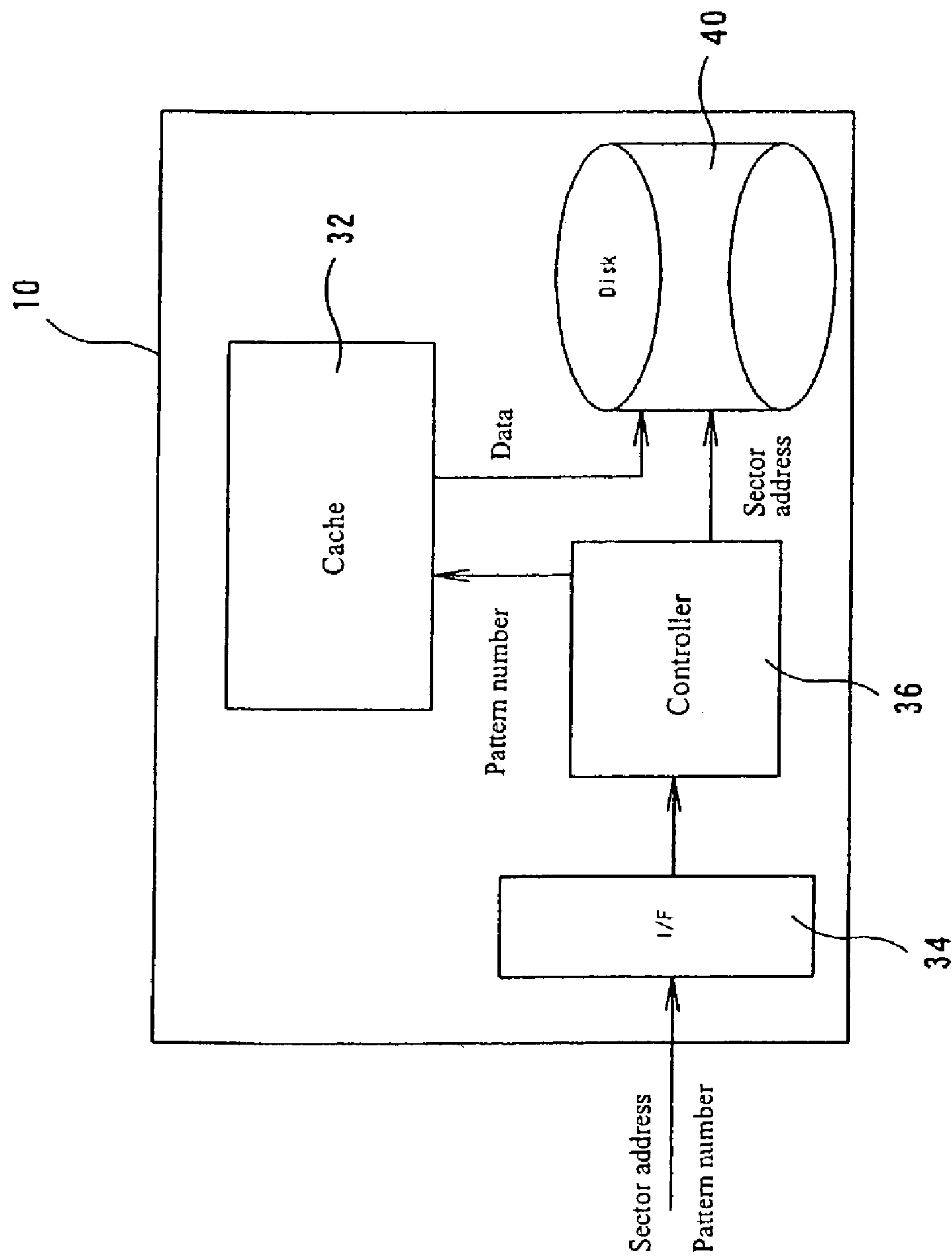

[Figure 3]
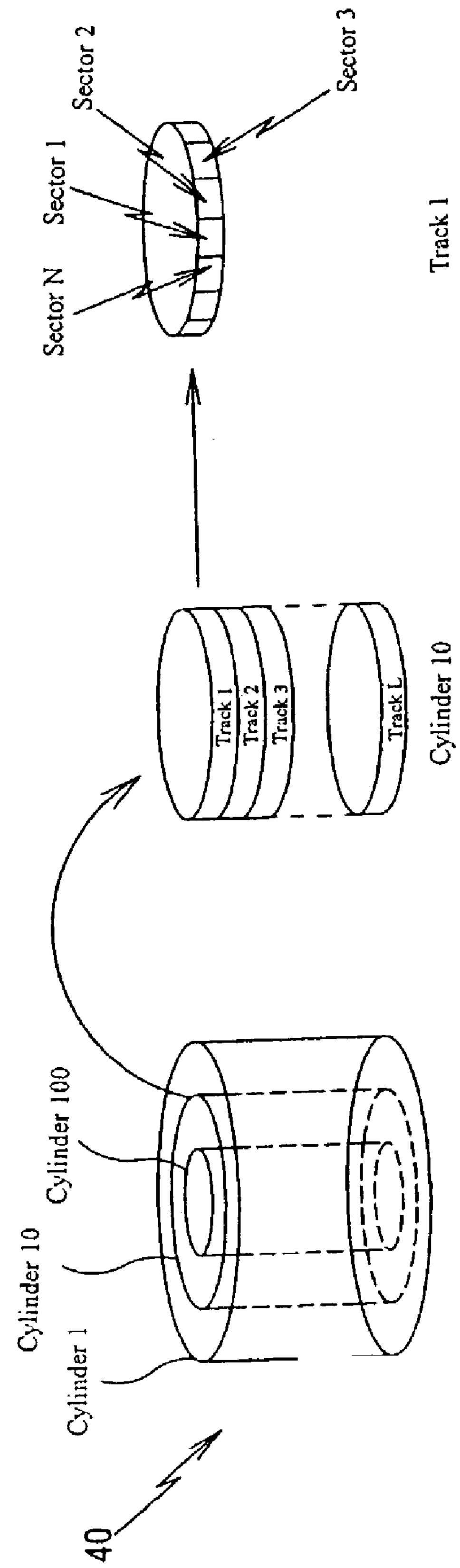

[Figure 4]
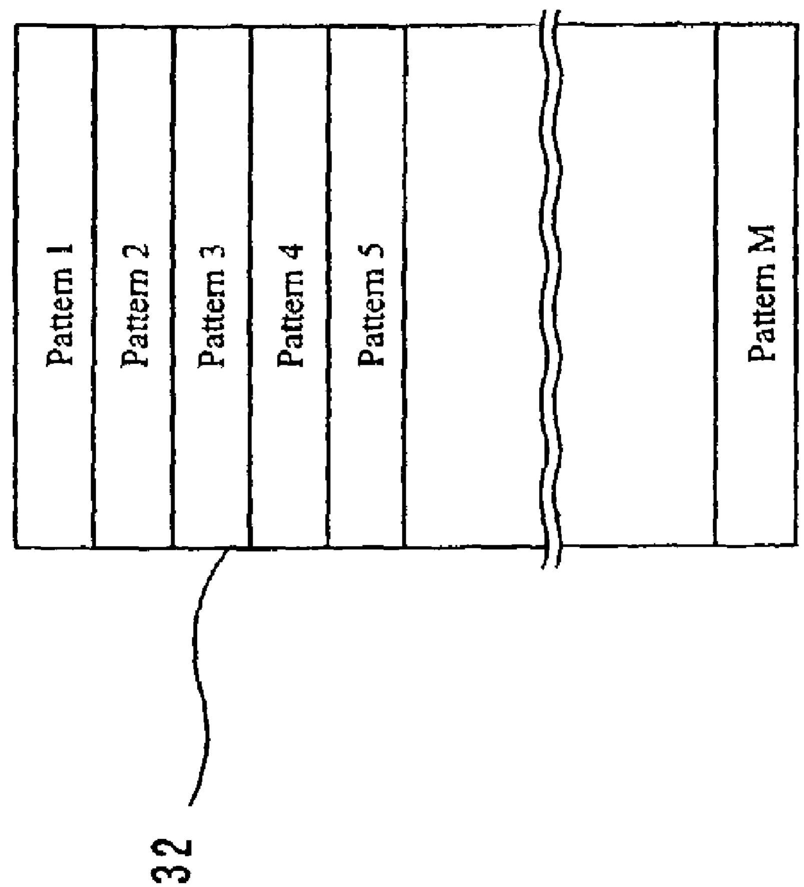

[Figure 5]

| Command | Content of command | Parameter |
|---|---|---|
| 1 | Store in cache | Pattern number, data (format data) |
| 2 | Write data | Address, pattern number, number of sectors |
| 3 | Write data | Address, pattern number, data, data size |

[Figure 6]
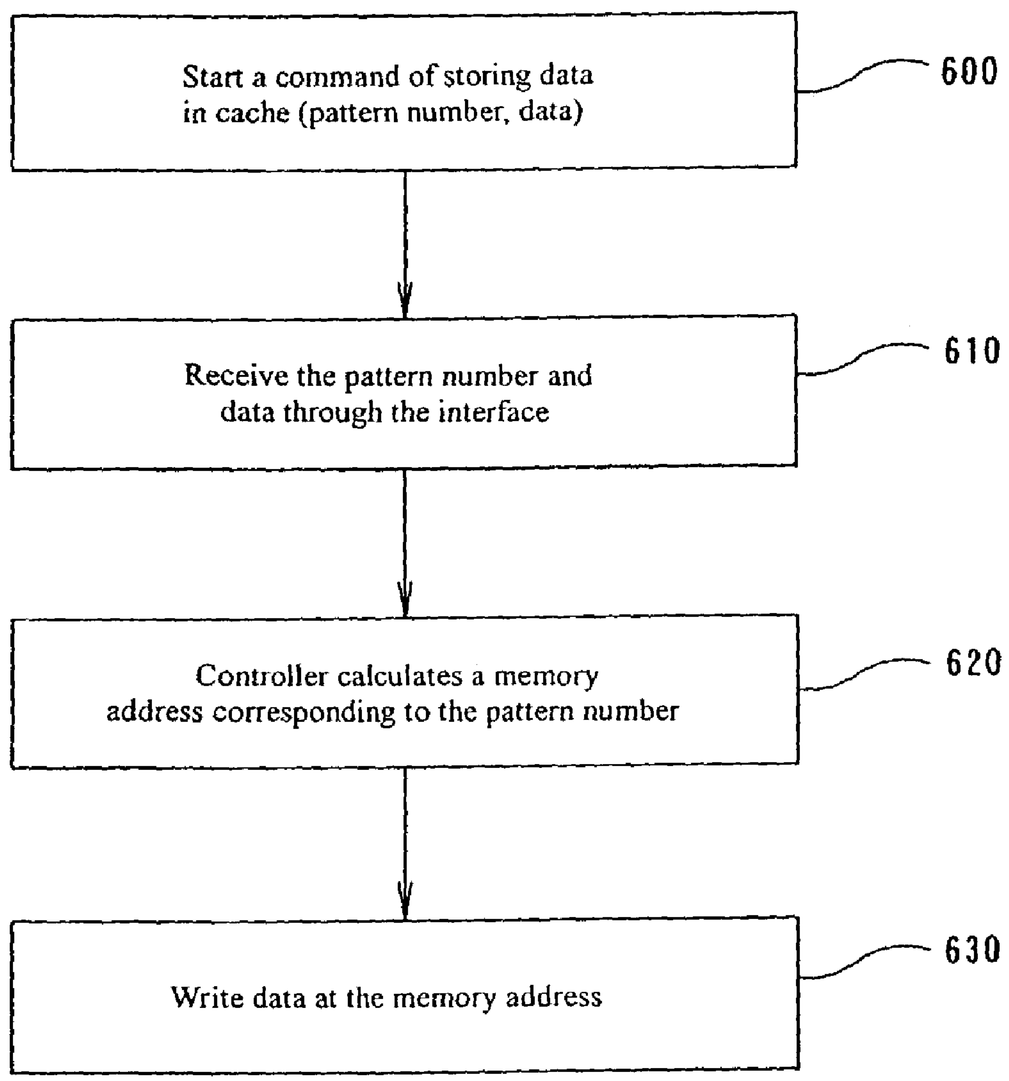

[Figure 7]
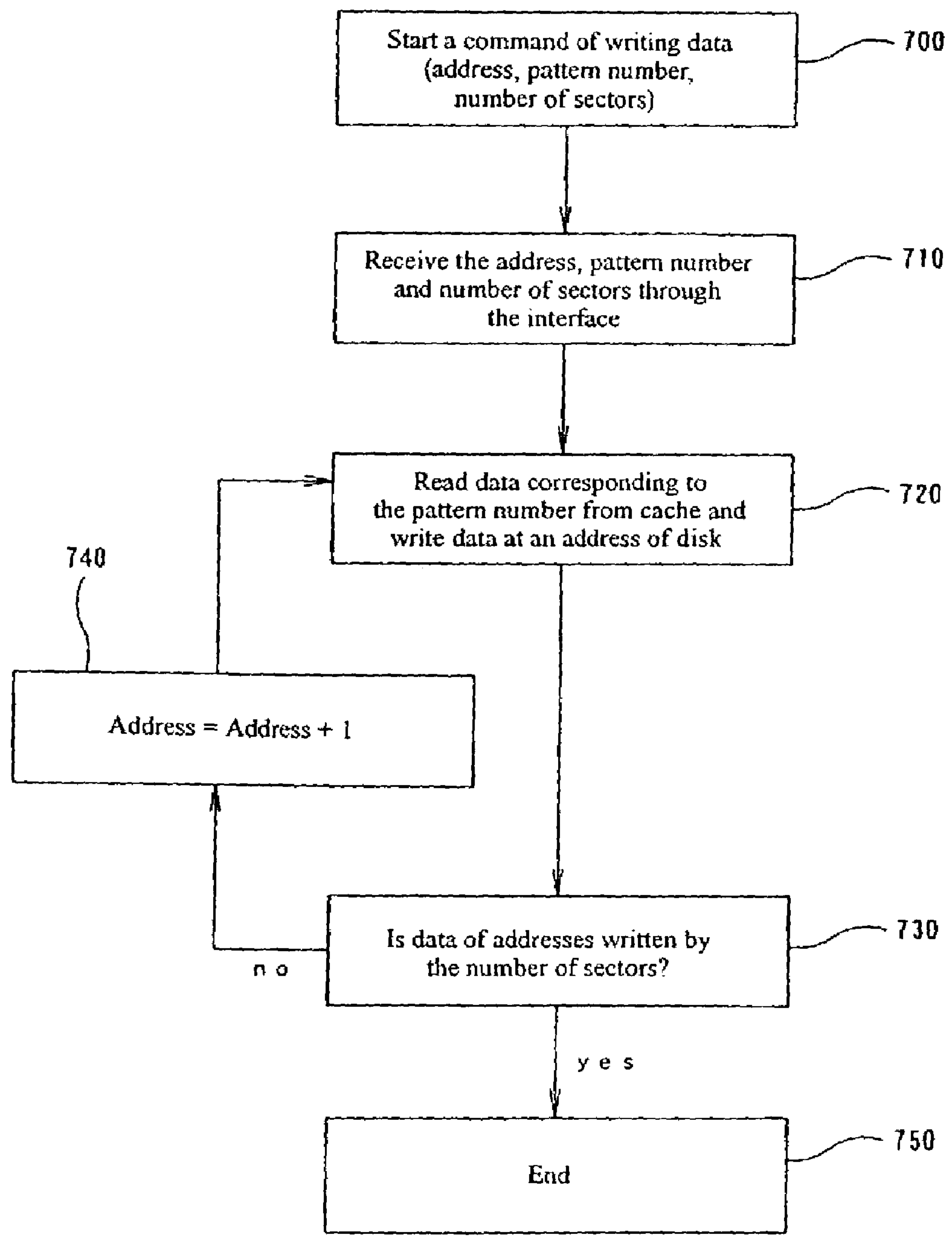

[Figure 8]
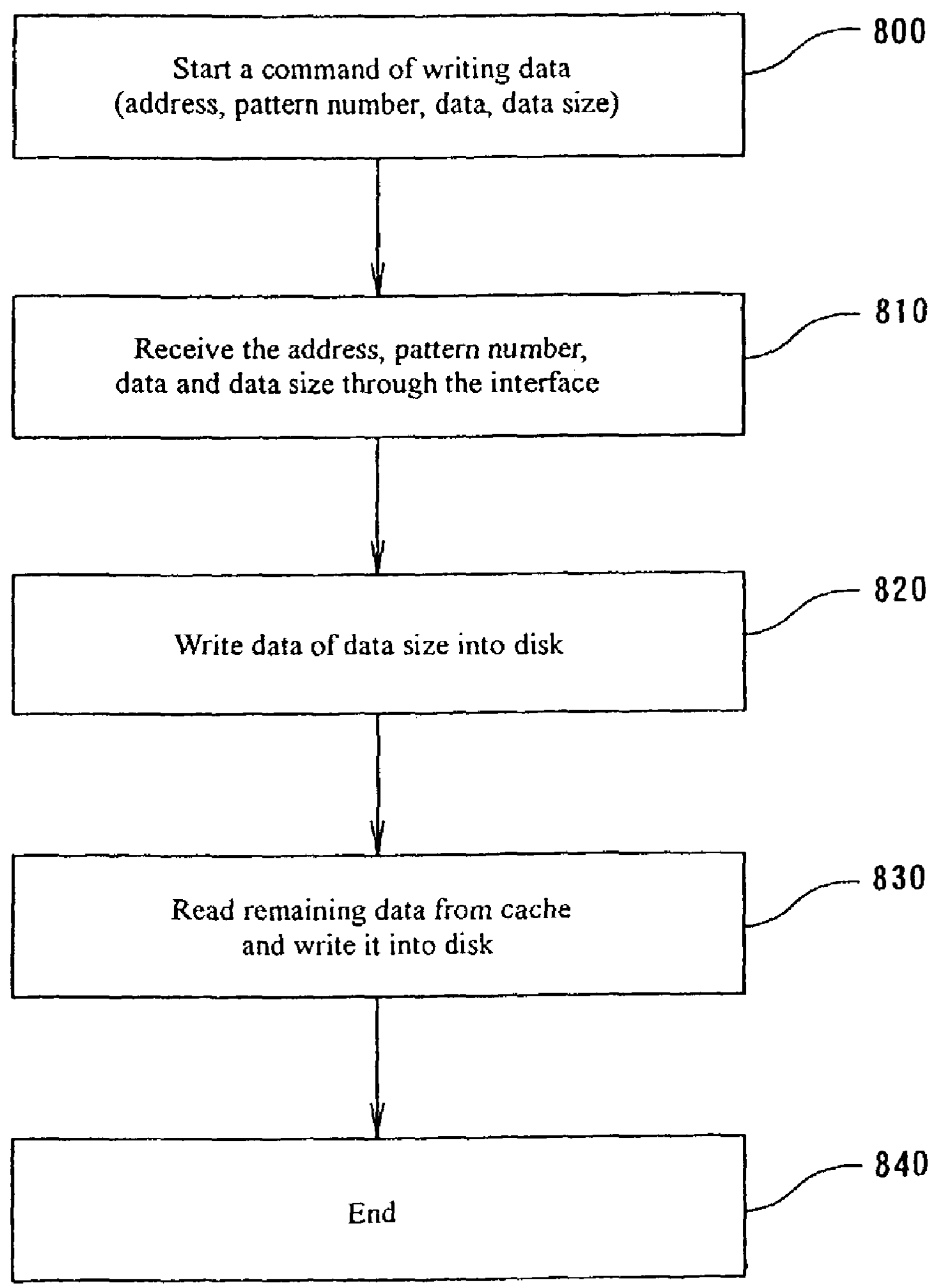

[Figure 9]

| | | | | | | | |
|---|---|---|---|---|---|---|---|
| 00 | 12 | 23 | 45 | 00 | 44 | 00 | 44 |
| 00 | 44 | 33 | 67 | 70 | 70 | 30 | 00 |
| 00 | 44 | 11 | 80 | 09 | 25 | 02 | 00 |
| 00 | 03 | 45 | 78 | 22 | 00 | 00 | 00 |

(a)

+

| | | | | | | | |
|---|---|---|---|---|---|---|---|
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |

(b)

=

| | | | | | | | |
|---|---|---|---|---|---|---|---|
| 00 | 12 | 23 | 45 | 00 | 44 | 00 | 44 |
| 00 | 44 | 33 | 67 | 70 | 70 | 30 | 00 |
| 00 | 44 | 11 | 80 | 09 | 25 | 02 | 00 |
| 00 | 03 | 45 | 78 | 22 | 00 | 00 | 00 |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |
| FF | FF | FF | FF | FF | FF | FF | FF |

(c)

[Figure 10]
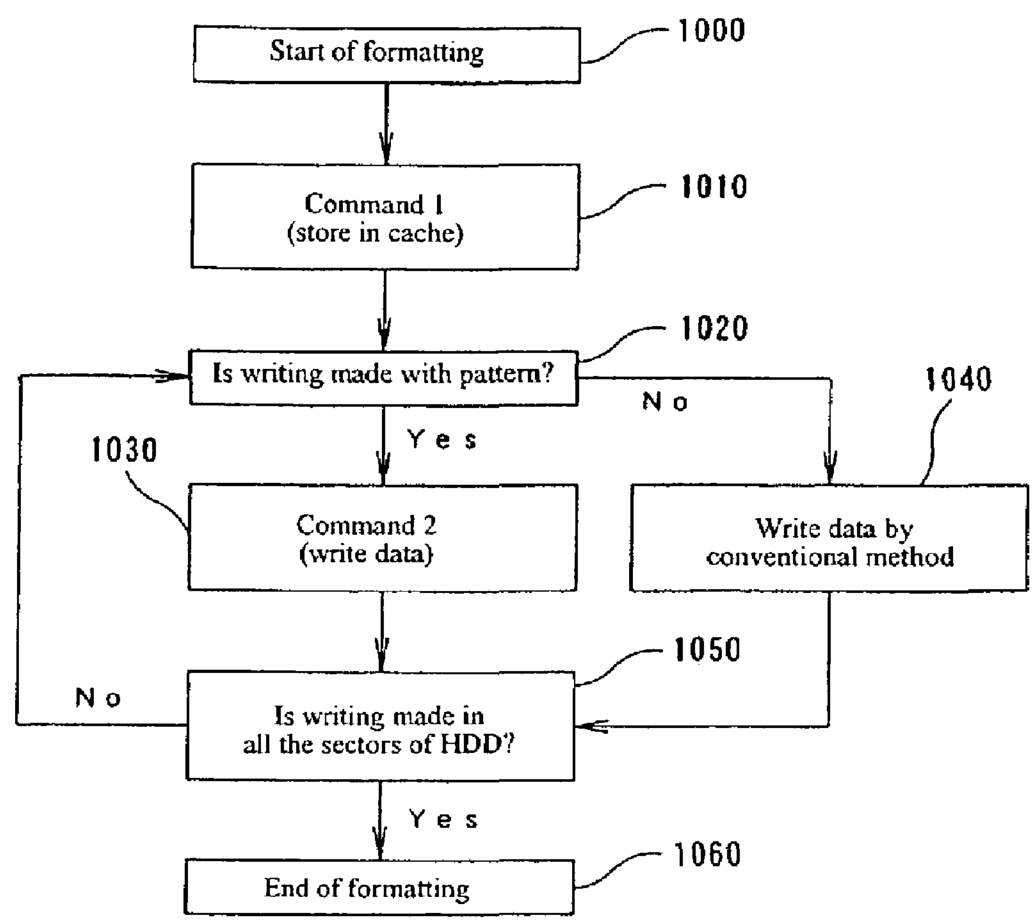

[Figure 11]
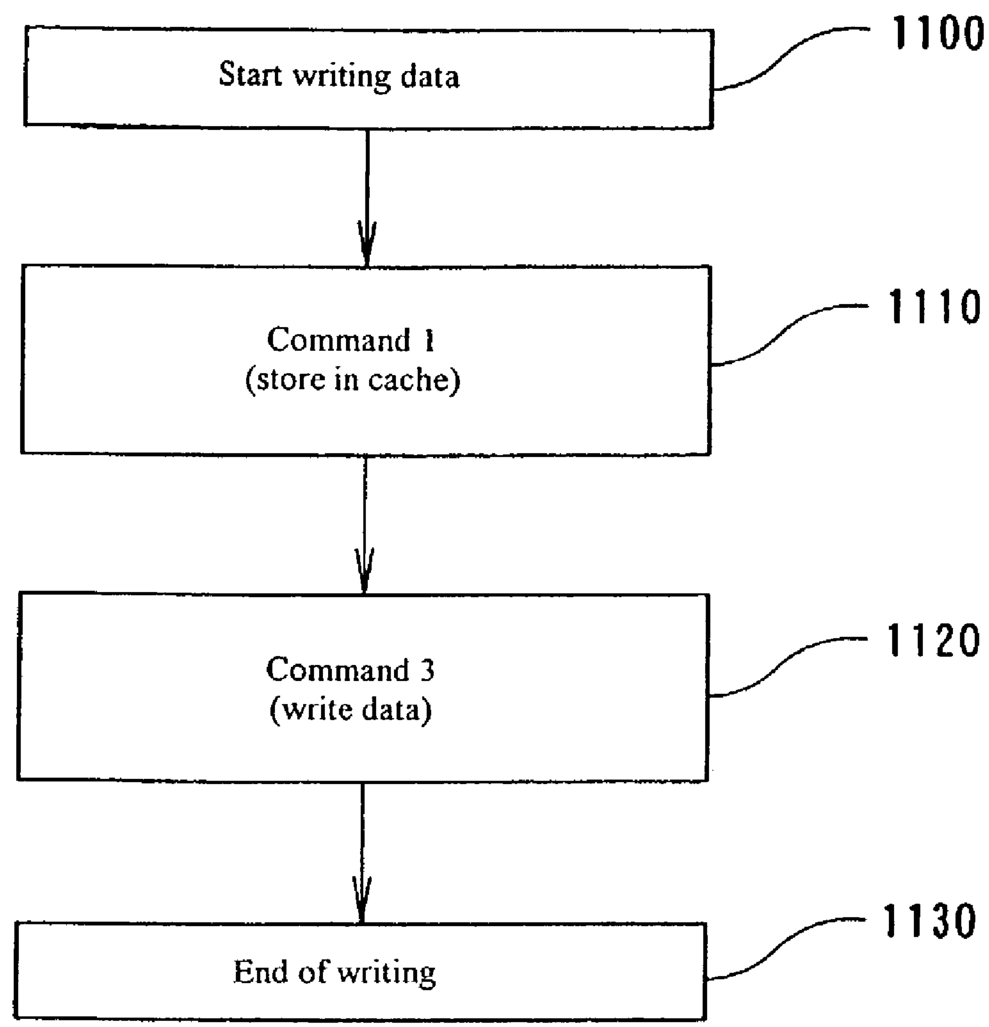

[Figure 12]
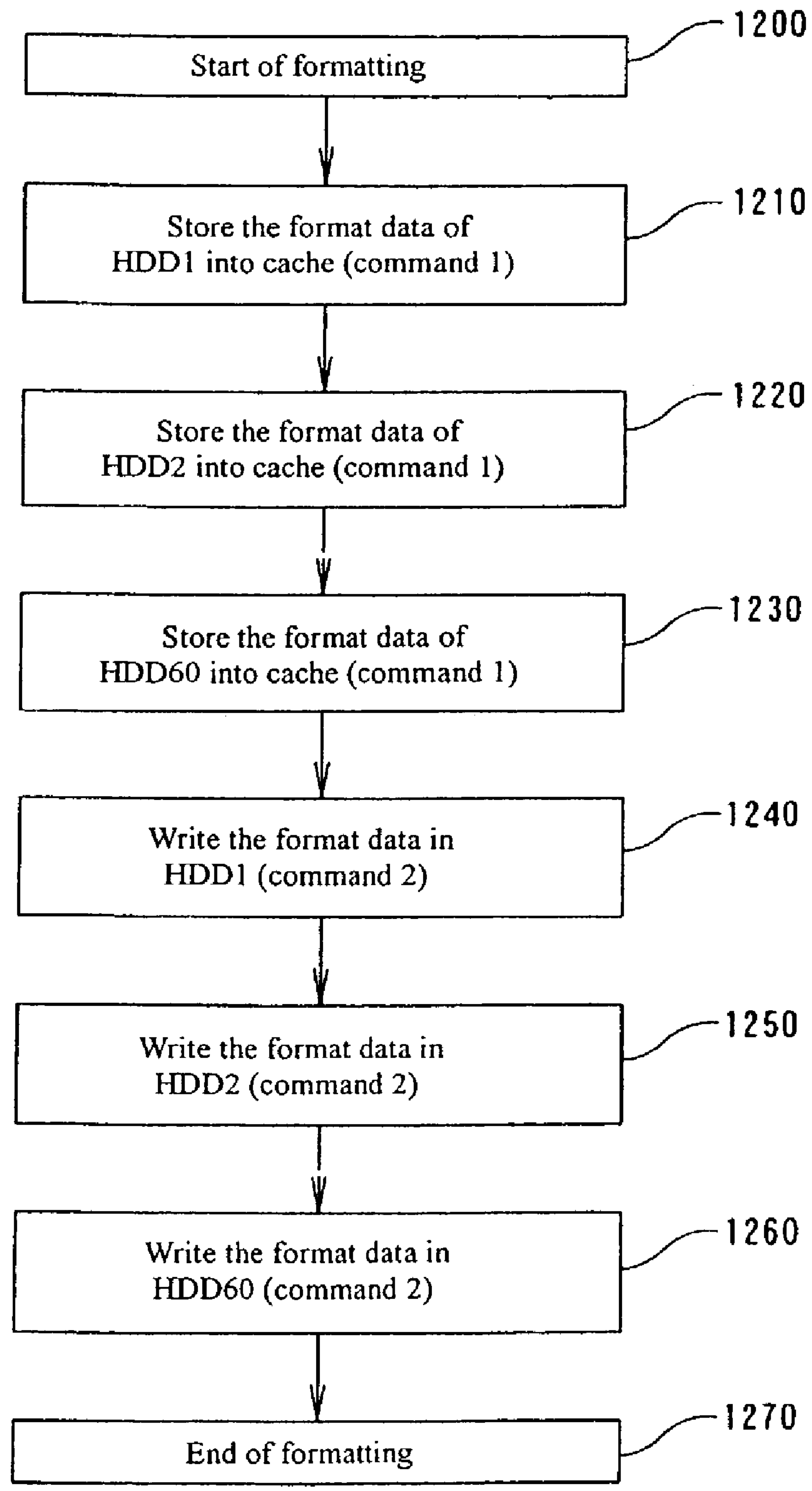

[Figure 13]
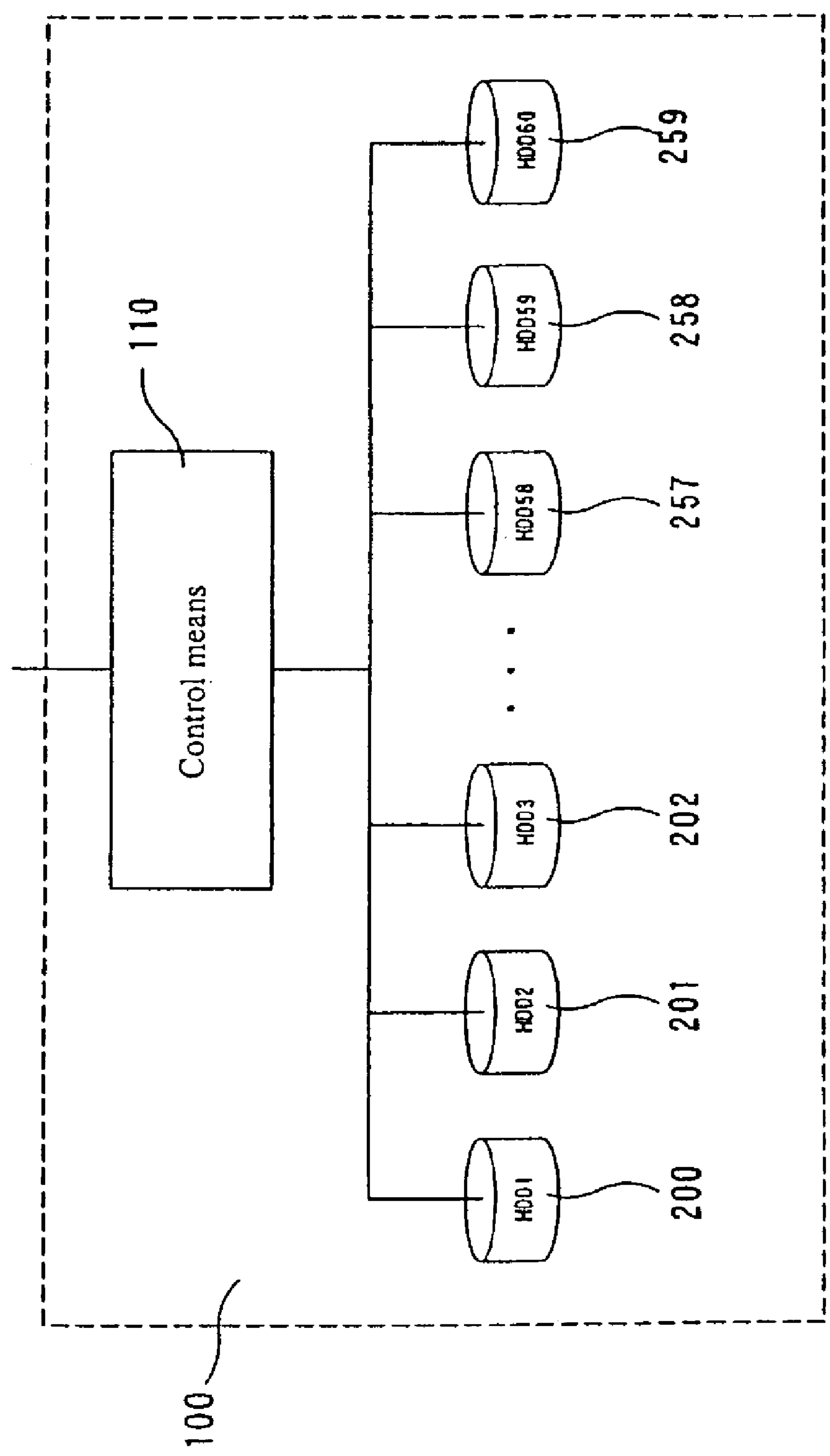

[Figure 14]
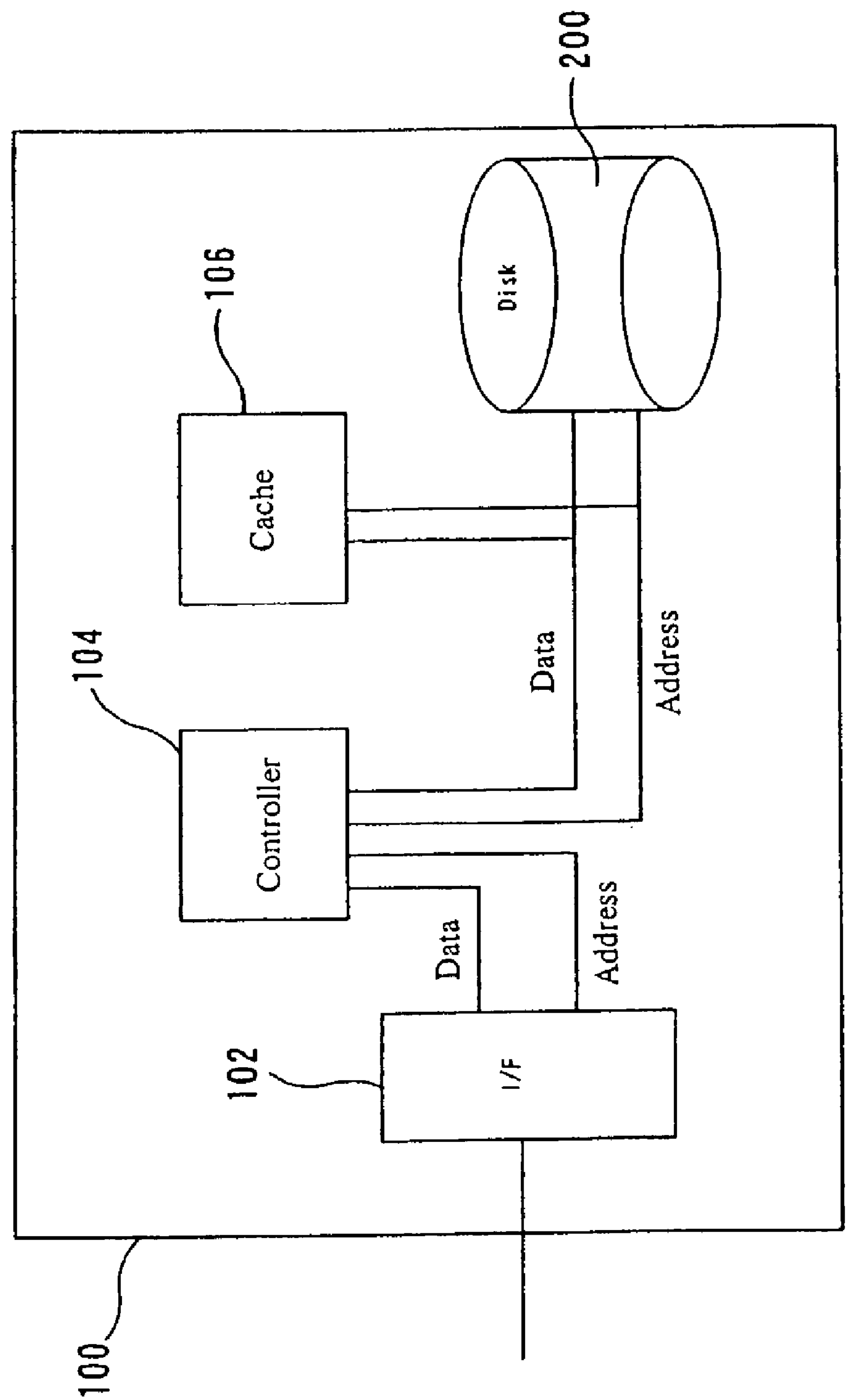

[Figure 15]

| 00 | 00 | 00 | 00 | FF | FF | FF | FF | FF | FF |
|---|---|---|---|---|---|---|---|---|---|
| 00 | 00 | 00 | 00 | FF | FF | FF | FF | FF | FF |
| 00 | 00 | 00 | 00 | FF | FF | FF | FF | FF | FF |
| 00 | 00 | 00 | 00 | FF | FF | FF | FF | FF | FF |
| 00 | 00 | 00 | 00 | FF | FF | FF | FF | FF | FF |
| 00 | 00 | 00 | 00 | FF | FF | FF | FF | FF | FF |
| 00 | 00 | 00 | 00 | FF | FF | FF | FF | FF | FF |
| 00 | 00 | 00 | 00 | FF | FF | FF | FF | FF | FF |

STORAGE DEVICE, INFORMATION PROCESSING SYSTEM HAVING STORAGE DEVICE, FORMAT METHOD FOR STORAGE DEVICE, DATA RECORDING METHOD, AND PROGRAM FOR IMPLEMENTING FORMATTING AND DATA RECORDING

BACKGROUND

1. Technical Field

The present invention relates to a storage device capable of shortening a working time for formatting which is an indispensable work for storage media such as a hard disk drive and RAID controller, and writing data efficiently, a system including such a storage device, a method for formatting the storage device, a data recording method, and a computer readable program for implementing such formatting of the storage device and data recording.

2. Background art

As a preparation for employing storage media such as hard disk drives (HDD), or a RAID (Redundant Array of Inexpensive Disks) controller for enabling a plurality of HDDs to be operated as one HDD, it is required to format the storage media. This formatting operation is made not only for deleting the contents stored in the storage medium, but also for checking each sector that is a storage area of the storage medium for any defect, and is indispensable as the preparation before use.

In recent years, it has been offered to improve the preservation of data by affording a redundancy to the storage device. To afford redundancy to the storage device, it is common in most cases to employ an information storage system or so-called RAID system using an array composed of a plurality of storage media to write information into the array. The use of this RAID system allows the storage capacity of the storage device to be greatly increased.

FIG. 13 is a schematic diagram of a storage device employing a well-known RAID configuration. As shown in FIG. 13, a storage device 100 comprises a plurality of storage media 200 to 259, in which data can be recorded in storage media 200 to 259 via control means 110 for controlling the storage media 200 to 259 with a RAID configuration. The control means 110 may comprise an ATA interface for controlling the storage media 200 to 259 with the RAID configuration, in which the ATA interface is connected via an appropriate interface to a host computer such as a microcomputer or server to transfer data.

FIG. 14 is a schematic diagram of the conventional storage device as shown in FIG. 13. As shown in FIG. 14, a storage device 100 comprises an interface (I/F) 102, a controller 104, a cache 106 and a storage medium 200 such as a DISK. One storage medium 200 is shown in FIG. 14. The storage medium 200 is connected to the cache 106 and the controller 104, and the controller 104 is connected via the interface 102 to information processing means such as host computer. The storage medium 200 has the data read or written in a sector that is a data recording unit. This sector size Is different depending on the kind of storage medium used. The data transferred from a file system for managing the data in the information processing means is converted into the data of sector size according to the kind of storage medium 200, whereby the data of sector size or its integral multiple is transferred. The interface 102 receives the data of sector size or its integral multiple, and sends the data to the controller 104 at a predetermined transfer rate, whereby the data is written in appropriate sectors of the storage medium 200 by the controller 104.

In writing the data into the storage medium 200 by the conventional method as shown in FIG. 14, a sector address specifying a sector of the storage medium 200 to be written and the data to be written are transferred from the file system to the storage device 100. In the HDD used as the storage medium 200, one sector is 512 bytes, and when the data having plural sector sizes is transferred, a process of transferring data of 512 bytes for each sector from the file system to the HDD and writing data is repeated, or a process of transferring the data of integral multiples of 512 bytes at a time and writing data into consecutive sectors is performed. Writing data into the storage medium 200 is slower than the data transfer rate from the file system to the storage device 100, and takes a lot of time, because it is performed by a head with mechanical operation. Therefore, the cache 106 is prepared to store data in the storage medium 200 that has been accessed in advance to enable the data to be accessed at higher speed, whereby the number of reads and writes of data from or into the storage medium 200 is minimized.

FIG. 15 is a view illustrating the data to be written in formatting the storage medium 200 as shown in FIG. 14. In formatting the storage medium 200 such as HDD, it is only necessary to transfer the format data as shown in FIG. 15 to each sector of the storage medium 200. The contents of this format data are varied depending on the used file system, and the different file system for each operating system (OS) is employed. In the storage device having a plurality of storage media, when all the storage media are formatted, the format data as shown in FIG. 15 is transferred to the interface by the number of storage media, so that it takes a lot of time in the file system for managing the data.

Conventionally, in the storage medium such as HDD or RAID controller, there was no means for distinguishing between the format data for use in formatting and the real data, whereby it was required for the file system to transfer the sector address and format data in the formatting operation, like the real data. Accordingly, the file system had to continuously pass the format data to the storage medium during the formatting operation. In the storage device having a plurality of storage media as shown in FIG. 13, it is supposed that there are provided 60 HDDs as the storage media. The HDD interface having the maximum performance at present is used for a fiber channel of 2 Gbytes, with the transfer rate of 200 Mbytes/sec. The write speed of HDD is about 40 Mbytes/sec in the maximum performance. When 60 HDDs are connected and data is efficiently written into all the HDDs, it is required to have an interface of 40 Mbytes/sec 60=2400 Mbytes/sec. In the HDD with the RAID configuration, the HDD interface is a bottleneck, the write speed is not increased, so that it takes a lot of time to write data. Also, the format data is made up of a certain pattern, the format data of certain pattern is repetitively transferred between the plurality of storage media and the file system, resulting in the formatting operation being less efficient.

In recent years, along with the faster computer system and the increased data amount, the capacity of storage medium such as HDD is greatly increased. However, the read or write speed of the storage medium does not catch up therewith, so that the time for writing the format data into all the sectors is increased in the formatting operation. The formatting operation is performed when the storage medium is used for the first time, when the storage medium is added, or when the storage medium has a failure and is recovered. As a measure of the storage medium for maintenance or against a failure, the storage medium employs a cluster configuration in which plural sectors are clustered in the minimum recording unit per file. Recovery of the cluster where a failure takes place is performed by stopping a part of the computer system, degrading the performance of the overall system, whereby it is required to make the recovery in a short time. In the development of the storage device, many tests for reading or writing data are conducted. In this case, it is necessary to format the storage medium for every test. Due to an increase in the capacity of storage mediums in recent years, the formatting operation takes a longer time. If the formatting operation takes a longer time, the time to conduct the test is decreased, whereby it is required to make the shipment without conducting the full test, causing a severe deficiency with regard to guaranteeing the quality of product. This may cause a significant nonconformity on the market, possibly with a great damage. Accordingly, there is a desire for a storage device capable of being formatted in a short time even if the capacity of storage medium is increased, a system having the storage device, and a formatting method.

SUMMARY

[Problems to be Solved by the Invention]

The present invention has been achieved in the light of the above-mentioned problems, and it is an object of the invention to provide a storage device capable of shortening a working time for formatting which is an indispensable job for increasing storage capacity, and relieving a file system from the load by receiving data of data size necessary to be written into one sector and generating the data of sector size using the format data stored in advance in the storage device, an information processing system having the storage device, a method for formatting the storage device, a data recording method, and a program for implementing such formatting and data recording.

[Summary of the Invention]

The present invention is based on an idea that a file system can format a storage medium by only transferring sector addresses of the storage medium to be formatted, with the format pattern being recorded in a cache of a storage device through an API (Application Program Interface) for formatting provided between the file system and the storage medium such as a HDD and a RAID controller. Also, this invention makes it possible to perform the formatting operation without transferring all the sector addresses, because the range of sectors can be specified by the sector addresses. Also, the invention makes it possible to shorten a working time for formatting by using the cache contained in the HDD or RAID controller, and improving the file system and the firmware without additional hardware.

That is, the present invention provides a storage device for writing data from and reading data to information processing means, comprising:

at least one storage medium;

means for storing plural patterns of format data for each pattern;

means for receiving a sector address specifying a sector of the storage medium to be written and a pattern identifier specifying a pattern of the format data to be written; and means for reading the format data having the pattern corresponding to the pattern identifier from the storing means and writing the read format data into the sector of the storage medium corresponding to the received sector address.

The storage device according to the invention may constitute a RAID system including plural storage media. The receiving means of the invention receives the number of sectors when the format data is written at the consecutive plural sector addresses, and receives the data having a data size smaller than the sector size and the data size, when the data having the data size smaller than the sector size is recorded.

In the storage device according to the invention, the writing means writes data into the consecutive sectors starting from the sector at the sector address by the number of sectors, when the format data is written at the consecutive plural sector addresses. Also, the writing means writes data of the data size into the sector at the sector address and the format data in a portion of the sector where the data is not written, generating the sector-sized data, when data having the data size smaller than the sector size and the data size of the data are received. Moreover, the writing means writes data of the data size into the sector at a specified sector address and the format data in a portion of the sector where the data is not written, generating the sector-sized data, when plural pieces of data having the data size smaller than the sector size are received.

According to this invention, there is provided an information processing system comprising information processing means and a storage device for writing data from and reading data to the information processing means, wherein the storage device comprises:

at least one storage medium;

means for storing plural patterns of format data for each pattern;

means for receiving a sector address specifying a sector of the storage medium to be written and a pattern identifier specifying a pattern of the format data to be written; and means for reading the format data having the pattern corresponding to the pattern identifier from the storing means and writing the read format data into the sector of the storage medium corresponding to the received sector address.

Moreover, according to the invention, there is provided a method for formatting at least one storage medium for use in a storage device which writes data from and reads data to information processing means, the method comprising the step of:

receiving format data necessary to format the storage medium and storing the format data in storing means for each pattern;

receiving a sector address specifying a sector of the storage medium to be written and a pattern identifier specifying a pattern of the format data to be written;

reading from the storing means the format data having the pattern corresponding to the pattern identifier; and writing the read format data in the sector of the storage medium corresponding to the received sector address.

In the method for formatting according to the invention, the storage device may constitute a RAID system comprising a plurality of storage media, in which the receiving step, the reading step and the writing step are repeated for all the storage media to format all the storage media.

According to the invention, there is provided a data recording method for use in a storage device which writes data from and reads data to information processing means, for recording sector-sized data on at least one storage medium, the sector-sized data being formed by combining data having a size smaller than a sector size and format data, the data recording method comprising the step of:

receiving format data necessary to format the storage medium and storing the format data in storing means for each pattern;

receiving a sector address specifying a sector of the storage medium to be written, a pattern identifier specifying a pattern of the format data to be written, the data having a size smaller than the sector size, and a data size of the data;

reading from the storing means the format data having the pattern corresponding to the pattern identifier; and writing the data having the data size in the sector of the storage medium corresponding to the received sector address, and the read format data in a portion of the sector where the data is not written.

According to the invention, there is further provided a computer readable program for use in a storage device which writes data from and reads data to information processing means, for formatting at least one storage medium, the program executing the step of:

receiving format data necessary to format the storage medium and storing the format data in storing means for each pattern;

receiving a sector address specifying a sector of the storage medium to be written, and a pattern identifier specifying a pattern of the format data to be written;

reading from the storing means the format data having the pattern corresponding to the pattern identifier; and writing the read format data in the sector of the storage medium corresponding to the received sector address.

Moreover, according to the invention, there is provided a computer readable program for use in a storage device which writes data from and reads data to information processing means, for recording sector-sized data on at least one storage medium, the sector-sized data being formed by combining data having a size smaller than a sector size and format data, the program comprising the step of:

receiving format data necessary to format the storage medium and storing the format data in storing means for each pattern;

receiving a sector address specifying a sector of the storage medium to be written, a pattern identifier specifying a pattern of the format data to be written, the data having a size smaller than the sector size, and a data size of the data;

reading from the storing means the format data having the pattern corresponding to the pattern identifier; and writing the data having the data size in the sector of the storage medium corresponding to the received sector address, and the read format data in a portion of the sector where the data is not written.

BRIEF DESCRIPTION OF THE DRAWINGS

FIG. 1 is a schematic diagram showing an information processing system having a storage device of the present invention;

FIG. 2 is a block diagram showing in detail the configuration of the storage device of the invention;

FIG. 3 is a view showing the details of the storage medium as shown in FIG. 2;

FIG. 4 is a view showing the details of a cache as shown in FIG. 2;

FIG. 5 is a table showing the parameters transferred from information processing means in the information processing system of the invention;

FIG. 6 is a flowchart showing a process of a command 1 as shown in FIG. 5;

FIG. 7 is a flowchart showing a process of a command 2 as shown in FIG. 5;

FIG. 8 is a flowchart showing a process of a command 3 as shown in FIG. 5;

FIG. 9 is a view illustrating data for use in the flowchart as shown in FIG. 8;

FIG. 10 is a flowchart showing a formatting process in this invention;

FIG. 11 is a flowchart showing a data recording process in this invention;

FIG. 12 is a flowchart for formatting a plurality of storage media in this invention;

FIG. 13 is a schematic diagram of a storage device employing the conventional RAID configuration;

FIG. 14 is a schematic diagram of the conventional storage device as shown in FIG. 13; and FIG. 15 is a view illustrating the data to be written in formatting the storage medium.

DETAILED DESCRIPTION

[Preferred Embodiment]

The preferred embodiments of the present invention will be described below with reference to the accompanying drawings, but the invention is not limited to those embodiments.

FIG. 1 is a schematic diagram showing an information processing system having a storage device of the present invention. The system as shown in FIG. 1 comprises the storage device 10 and information processing means 20, which receives a formatting request or a request for recording data from the user, manages, processes or generates the data, transfers the data to be read or written to the storage device 10, or receives the data from the storage device 10. The storage device 10 receives the address or data from the information processing means 20, stores the data in accordance with the address, reads necessary data upon a request from the information processing means 20, or sends the data to the information processing means 20. The storage device 10 as shown in FIG. 1 comprises control means 30 and a plurality of storage media 40 to 99, and has a storage capacity adaptable to that required for the information processing means 20. In an embodiment as shown in FIG. 1, the storage media 40 to 99 are configured as 60 units of HDD that are connected. Also, the control means 30 comprises storing means for storing plural patterns of format data for each pattern, means for receiving a sector address specifying a sector of the storage media 40 to 99 to be written and a pattern identifier specifying a pattern of the format data to be written, and means for reading the format data having the pattern corresponding to the pattern identifier from the storing means and writing the read format data in the sector of the storage media 40 to 99 corresponding to the received sector address.

The information processing means 20 as shown in FIG. 1, upon receiving a formatting request or a request for recording data from the user, accesses the storage device 10, acquires the information regarding the capacity and type of the storage device 10, converts the data into appropriate data format, confirms whether or not the storage device 10 is ready for receiving the data, and then transfers the real data including the format data and necessary data to the storage device 10. The data transferred to the storage device 10 is managed by a file system in the information processing means 20. The storage device 10 as shown in FIG. 1 receives the format data transferred from the file system, and temporarily stores it in the storing means. In the case where plural patterns format data are transferred from the file system, the format data is arranged and stored for each pattern in the storing means. The formatting of the storage media 40 to 99 is performed by simply giving a sector address specifying a sector to be formatted from the file system and a pattern identifier specifying which data to write among the format data stored in advance in the storing means. In this invention, it is unnecessary to transfer the same format data from the file system to each sector, and it is possible to shorten a working time for formatting. Also, in the information processing system of this invention, the information processing means 20 can perform another process after the end of transferring a sector address necessary to format the storage device 10 and a pattern identifier.

The storage media 40 to 99 for use in this invention are not specifically limited, but may be the storage medium such as HDD, the RAID controller, and rewritable storage media such as CD-R, CD-RW, DVD and MO. Also, in this invention, the storage media 40 to 99 may be configured as individual units of the same storage medium such as HDD, or separate units composed of the storage medium such as HDD and another storage medium such as MO.

The information processing means 20 for use in this invention may be any host computer that has been well known up to now, and specifically a personal computer or a workstation. The personal computer or workstation may mount a CPU such as PENTIUM® (registered trademark), PENTINUM II (registered trademark), PENTINUM III (registered trademark), or its compatible CPU, and operate on an operating system such as the WINDOWS® (registered trademark), WINDOWS® NT (registered trademark), OS/2 (registered trademark), Unix® or Linux, or may mount Power PC (registered trademark) or its compatible CPU, and operate on an operating system such as OS/2 (registered trademark), AIX (registered trademark), or Mac OS (registered trademark).

FIG. 2 is a block diagram showing the configuration of the storage device 10 of the invention as shown in FIG. 1. The storage device 10 as shown in FIG. 2 comprises a storage medium 40 such as HDD, storing means 32 for storing plural patterns of format data in a memory address for each pattern, means 34 for receiving a sector address transferred from the file system and a pattern identifier specifying a pattern, and means 36 for calculating the memory address corresponding to the pattern identifier, reading the format data stored at the calculated memory address, and writing the read format data in the sector of the storage medium 40 corresponding to the received sector address. In FIG. 2, the storing means comprises a cache 32 for storing the format data of each pattern with the memory address to facilitate the reading and writing, an interface (I/F) 34 as receiving means, and a controller 36 as writing means.

In the embodiment as shown in FIG. 2, the storage medium 40 is connected directly or via the cache 32 to the controller 36, which is further connected to the interface 34. The interface 34 receives the data, the pattern identifier and the sector address transferred from the file system of the information processing means 20 shown in FIG. 1. The cache 32, interface 34 and controller 36 for use in the storage device 10 of this invention may be any components having equivalent functions as hitherto well known, as long as the cache 32 is capable of reading and writing fast, the interface 34 is capable of transferring data such as ATA, and the controller 36 is capable of storing the received data in the cache 32 and reading and writing data to or from the storage medium 40 such as a MPU (Micro-Processing Unit).

FIG. 3 is a view showing the details of the storage medium 40 such as HDD DISK as shown in FIG. 2. The storage medium 40 as shown in FIG. 3 has coaxial cylinders of different diameters, each cylinder being virtual and composed of the set of tracks that is an area for recording the data. Though the cylinders 1, 10 and 100 are only shown in FIG. 3, the cylinders 2 to 9 are provided between cylinder 1 and cylinder 10, the cylinders 11 to 99 are provided between cylinder 10 and cylinder 100, and the cylinders 101 to the maximum cylinder number are contained inside the cylinder 100. Herein, the number indicates the cylinder number. For example, the cylinder 10 contains the tracks 1 to L that are areas for recording the data. The storage medium 40 such as HDD has a greater length of track per unit time in the tracks of the outer cylinder than tracks of the inner cylinder, because the disk is rotated at a fixed speed. The tracks of the outer cylinder and the tracks of the inner cylinder have the same storage capacity, whereby the recording density is lower in the tracks of the outer cylinder and higher in the tracks of the inner cylinder. Also, each track, for example, the track 1 having track number 1 is partitioned into sector 1 to sector N, so that the data is read or written in a unit of sector. A sector address is allocated to specify each sector. In this invention, the storage medium 40 has the cylinders or tracks residing as hardware, but may be simply regarded as the sectors arranged continuously in order. Accordingly, the consecutive addresses can be allocated to the sectors of the storage medium 40 arranged in order without respect to the cylinders or tracks, whereby the data is written consecutively in the consecutive addresses. Also, from the interface 34 as shown in FIG. 2, it looks like the sectors are arranged consecutively in order, whereby the interface 34 can receive the sector address and the number of sectors to write the data into the sector at predetermined address or into consecutive sectors beginning at predetermined address by the number of sectors.

FIG. 4 is a view showing the details of the cache 32 as shown in FIG. 2. The cache 32 as shown in FIG. 4 is partitioned to store plural patterns of format data, such as pattern 1 to pattern M. The memory address is allocated to each pattern. A different pattern of format data received by the interface 34 as shown in FIG. 2 is stored in each memory address allocated within the cache 32 in accordance with each pattern. The controller 36 is employed to store the format data at the memory address allocated within the cache 32. The cache 32 also stores the transferred data to be read or written repeatedly, besides the format data. In this invention, plural patterns of format data are received along with the pattern identifier corresponding to each pattern, in which the controller 36 calculates a memory address allocated within the cache 32 corresponding to each pattern identifier and stores the format data at the memory address. In this manner, the storage medium 40 is formatted by transferring the pattern identifier corresponding to the format data to be written into each sector of the storage medium 40 and reading the specified format data from the cache 32.

FIG. 5 is a table showing the parameters transferred from information processing means in the information processing system of the invention. In FIG. 5, three commands are shown, in which different parameters are transferred to the storage device depending on the command. Command 1 as shown in FIG. 5 executes a process of transferring in advance the format data to the storage device 10 as shown in FIG. 2 and storing it in the cache 32, when receiving a formatting request from the user, or recording the data having a data size smaller than the sector size. With command 1, the format data used and the pattern identifier stored at predetermined memory address within the cache 32 as shown in FIG. 2 are transferred from the file system to the storage device 10 corresponding to the formatting request from the user. In FIG. 5, the pattern identifier is indicated as the pattern number. The storage device 10 as shown in FIG. 2 receives the format data and the pattern number, calculates the memory address corresponding to the pattern number under the control of the controller 36, and stores the format data at its memory address.

In the case where plural patterns of format data are transferred, each format data is stored corresponding to each memory address.

Command 2 as shown in FIG. 5 is executed after the end of command 1, in which the sector address of the storage medium 40 to be formatted and the pattern number for reading the format data to be written at that sector address from the cache 32 as shown in FIG. 2 are transferred to the storage device 10. The interface 34 as shown in FIG. 2 receives the sector address and the pattern number, and the controller 36 calculates the memory address from the pattern number received through the interface 34, and reads the format data stored at the memory address within the cache 32. The format data read from the cache 32 is written into the sector of the storage medium 40 corresponding to the sector address received through the interface 34 as shown in FIG. 2. Writing the format data is performed for all the sector addresses received through the interface 34. With command 2, in the case where the same format data is written in the consecutive sector addresses, the pattern number for reading the format data stored in the cache 32 and the sector address, as well as the number of sectors, are transferred. In this case, the sector address is the first address of consecutive sectors, and the range of address to write is decided by the number of sectors. In this invention, the sector address to write may be transferred individually without transferring the number of sectors. The storage device 10 employing the storage medium 40 with the RAID system comprising a plurality of HDDs only needs to receive a small amount of data including the sector address of the storage medium 40 and the pattern number through the interface 34, whereby the format data is written in parallel into the storage media 40 arranged in parallel without decreasing the write speed.

In command 3 as shown in FIG. 5, if the real data is received and has a data size smaller than the sector size, the data of the data size is only received, and written into the storage medium 40 as shown in FIG. 2, and the format data is written in a portion of the sector where the data is not written. After the format data is stored in the cache 32 by command 1, the interface 34 receives the data having a data size smaller than the sector size, the data size, the pattern number, and the sector address. Herein, the data having data size smaller than the sector size specifically means necessary data in part, such as the history information of extracting data from the application database, data structure information, data conversion information, meta-data having the attribute, characteristics and meaning regarding the architecture and contents of database. In the HDD having one sector size of 512 bytes, necessary data is 100 bytes, and unnecessary data is remaining 412 bytes, for example. In this invention, the interface 34 receives only necessary data of 100 bytes, with the pattern number and the sector address to write. The format data corresponding to the pattern number is read from the cache 32 by the controller 36 as shown in FIG. 2. The necessary data of 100 bytes is written into the sector of the storage medium 40 corresponding to the sector address, and the read format data is written in the remaining 412 bytes. In this manner, data of sector size is formed and stored in each sector of the storage medium 40. In this invention, a smaller amount of data is transferred between the file system and the storage device 10, as above described, thereby greatly relieving the bus connecting them from the load. Also, in this invention, each command may be stored as a computer readable program. In this case, the program is started to execute each command, upon a formatting request or a request for recording the data from the user.

FIGS. 6 to 8 are flowcharts showing a process of executing each command as shown in FIG. 5. In the process as shown in FIG. 6, if the information processing means receives a formatting request from the user, command 1 is started at step 600. In the above manner, the format data to be transferred to the storage device, and the pattern number corresponding to the memory address within the cache to store are decided, and transferred to the storage device. At step 610, the pattern number and the format data are received by the interface. In the case where the storage medium is HDD, one or more patterns of format data of 512 bytes can be received. The controller calculates the memory address of the cache corresponding to the pattern number at step 620. Then, the controller writes the format data at the calculated memory address at step 630, whereby the process of executing the command 1 is ended. In this invention, before the pattern number and the format data are transferred from the file system, a notification indicating that the storage device is ready or a notification indicating that the format data is stored in the cache is returned to the information processing means, and the next process is performed by receiving the notification.

The process as shown in FIG. 7 is performed after completion of the process as shown in FIG. 6. At step 700, command 2 is started. The data necessary to format the storage medium is transferred from the file system. At step 710, the interface receives the sector address indicating the sector of the storage medium to write the format data, and the pattern number specifying the format data to be written. When consecutive sectors are formatted, the interface can further receive the number of sectors. Then, the controller reads the format data to be written from the cache on the basis of the pattern number. At step 720, the format data is written into the corresponding sector of the storage medium on the basis of the sector address and the read format data. At step 730, a determination is made whether or not format data is written in the specified number of sectors. If the number of sectors is received at step 710, "no" is selected, and the operation goes to step 740, where the next consecutive address is specified. The next address is decided in accordance with a calculation expression as shown in FIG. 7. Again, the format data is written into the corresponding sector of the storage medium on the basis of the sector address and the format data read according to the pattern number specified at step 720. Then, a determination is made again whether format data is written into the specified number of sectors at step 730. If format data is written into all the sectors specified at step 730, "yes" is selected, and the operation proceeds to step 750, whereby the formatting operation is ended.

The process as shown in FIG. 8 is performed after completion of the process as shown in FIG. 6. At step 800, command 3 is started. The data having a data size smaller than the sector size to be written, the data size, the pattern number, and the sector address are transferred from the file system to the storage device 10. The interface receives the data, its data size, the pattern number and the sector address at step 810. The controller writes the data of data size at the received sector address at step 820. At step 830, the controller reads the format data stored in the cache in accordance with the pattern number, and writes the format data in a portion of the sector at the sector address where the data is not written at step 820. In this invention, the format data may be written first, and then the data of data size may be written. If writing the data of data size and the format data at the sector address is ended, the process of executing command 3 is ended at step 840.

FIG. 9 is a view illustrating data for use in the step 820 and 830 of the process as shown in FIG. 8. FIG. 9A shows plural pieces of data of data size as two-digit numerical value, in which the blank portion is unnecessary data, indicating that no data is transferred from the file system. FIG. 9B is a view showing one example of the format data. The data shown in FIG. 9B has a data configuration as all represented by "FF". At step 820 of the process as shown in FIG. 8, the data as shown in FIG. 9A is only written at the specified sector address, and at step 830, the format data as shown in FIG. 9B is written in the blank portion. Then, data of one sector size is formed as shown in FIG. 9C. In this manner, it is possible to transfer a smaller amount of data from the information processing means to the storage device, and shorten the data transfer time.

FIG. 10 is a flowchart showing a formatting method in this invention. In the process as shown in FIG. 10, command 1 and command 2 are employed. First of all, at step 1000, formatting is started, when the information processing means receives a formatting request from the user. The format data necessary for the file system, the sector address to write the format data, and the pattern number specifying the format data stored in the cache are transferred to the storage device. At step 1010, command 1 of executing the process as shown in FIG. 6 is started, whereby the format data is stored at the memory address in the cache specified by the pattern number. Then, at step 1020, a determination is made whether or not the format data stored in the cache is written. If the format data stored in the cache is written, "yes" is selected, and the operation proceeds to step 1030. If not, "no" is selected, and the operation goes to step 1040.

At step 1030 as shown in FIG. 10, command 2 of executing the process as shown in FIG. 7 is started, whereby the format data stored in the cache is read from the pattern number received through the interface, and written at the corresponding sector address of the storage medium on the basis of the sector address received through the interface. At step 1040, since the format data is not stored in the cache, the format data and the sector address are received through the interface and the format data is written at the sector address of the storage medium corresponding to the sector address by the conventional writing method. Then, at step 1050, a determination is made whether or not the format data is written in all the sectors. If the format data is written in all the sectors, "yes" is selected, and the formatting operation is ended at step 1060. Also, if the format data is not written in all the sectors, "no" is selected, and the operation returns to step 1020 again, whereby step 1030 or 1040 is performed.

FIG. 11 is a flowchart showing a data recording method for the HDD. In the data recording method of the invention, the data of a data size smaller than the sector size is transferred, and the sector-sized data is formed by combining the data and the format data stored in advance in the cache, and recorded. In the flowchart as shown in FIG. 11, at step 1100, data having a data size smaller than the sector size is started. At step 1110, command 1 of executing the process as shown in FIG. 6 is started, whereby the format data as shown in FIG. 9B is stored at the memory address in the cache corresponding to the pattern number. Then, at step 1120, command 3 of executing the process as shown in FIG. 8 is started, whereby the sector address, the pattern number, the data and the data size are transferred from the file system and received through the interface. The format data stored at the memory address corresponding to the pattern number is read by the controller, and the data received through the interface is written by the data size in the sector specified by the sector address. The data after writing is simply the data as shown in FIG. 9A. Then, the read format data is written in a blank portion of the sector where the data of data size is written. By writing the format data in this manner, the data of one sector size as shown in FIG. 9C is formed and stored in the sector. At step 1130, the sector-sized data is formed and stored by combining all the transferred data and the format data, whereby the data writing operation is ended.

FIG. 12 is a flowchart for formatting a plurality of storage media 40 in this invention. The process as shown in FIG. 12 involves formatting all the storage media 40 to 99 of the storage device 10 as shown in FIG. 1. At step 1200, the formatting operation is started. The formatting is started upon a format request from the user. First of all, at step 1210, the format data necessary to format the storage medium 40 (HDD1) as shown in FIG. 1 and the pattern number are transferred to the storage device 10, and the format data is stored in the cache of the storage device 10. At step 1220, the format data necessary to format the next storage medium 41 (HDD2) as shown in FIG. 1 and the pattern number are transferred to the storage device 10, and the format data is stored in the cache of the storage device 10. Likewise, at step 1230, the format data necessary to format each of the storage medium 42 (HDD3) to storage medium 99 (HDD60) as shown in FIG. 1 and the pattern number are transferred to the storage device 10, and the format data is stored in the cache of the storage device 10. Each format data is stored at each memory address allocated in the cache according to the pattern.

At step 1240 as shown in FIG. 12, the format data is written in all the sectors of the storage medium 40 as shown in FIG. 1. The process as shown in FIG. 7 is performed for each sector of the storage medium 40 at step 1240, whereby the format data is written in all the sectors and the step 1240 terminated. At step 1250, the formatting operation is started for the next storage medium 41 as shown in FIG. 1. The process as shown in FIG. 7 is performed for all the sectors of the storage medium 41, whereby the format 1240 and 1250, the format data is written in all the sectors of the storage medium 42 to storage medium 99 and the step 1260 terminated.

Aspects of the invention may be described by the following entries:

Entry (1) A storage device for writing data from and reading data to information processing means, comprising:
- at least one storage medium;
- means for storing plural patterns of format data for each pattern;
- means for receiving a sector address specifying a sector of said storage medium to be written and a pattern identifier specifying a pattern of said format data to be written; and
- means for reading said format data having said pattern corresponding to said pattern identifier from said storing means and writing said read format data into the sector of said storage medium corresponding to said received sector address.

Entry (2) The storage device according to Entry 1, wherein said storage device constitutes a RAID system including plural storage media.

Entry (3) The storage device according to Entry 1 or 2, wherein said receiving means receives the number of sectors when said format data is written at said consecutive plural sector addresses.

Entry (4) The storage device according to Entry 1 or 2, wherein said receiving means receives data having a data size smaller than a sector size and the data size of said data.

Entry (5) The storage device according to Entry 3, wherein said writing means writes data into the consecutive sectors starting from the sector at the sector address by said number of sectors, when said format data is written at said consecutive plural sector addresses.

Entry (6) The storage device according to Entry 4, wherein said writing means writes data of said data size into the sector at said sector address and said format data in a portion of said sector where said data is not written, when data having the data size smaller than said sector size and the data size of said data are received.

Entry (7) The storage device according to Entry 6, wherein said writing means writes data of said data size into the sector at a specified sector address and said format data in a portion of said sector where said data is not written, when plural pieces of data having the data size smaller than said sector size are received.

Entry (8) An information processing system comprising information processing means and a storage device for writing data from and reading data to said information processing means, wherein said storage device comprises: at least one storage medium;

means for storing plural patterns of format data for each pattern;

means for receiving a sector address specifying a sector of said storage medium to be written and a pattern identifier specifying a pattern of said format data to be written; and means for reading said format data having said pattern corresponding to said pattern identifier from said storing means and writing said read format data into the sector of said storage medium corresponding to said received sector address.

Entry (9) A method for formatting at least one storage medium for use in a storage device which writes data from and reads data to information processing means, said method comprising the step of:

receiving format data necessary to format said storage medium and storing said format data in storing means for each pattern;

receiving a sector address specifying a sector of said storage medium to be written and a pattern identifier specifying a pattern of said format data to be written;

reading from said storing means said format data having said pattern corresponding to said pattern identifier; and writing said read format data in the sector of said storage medium corresponding to said received sector address.

Entry (10) The method for formatting according to Entry 9, wherein said storage device constitutes a RAID system comprising a plurality of storage media, in which said receiving step, said reading step and said writing step are repeated for all the storage media.

Entry (11) The method for formatting according to Entry 9 or 10, wherein said receiving step comprises receiving the number of sectors when said format data is written at said consecutive plural sector addresses.

Entry (12) The method for formatting according to Entry 11, wherein said writing step comprises writing data into the consecutive sectors starting from the sector at the sector address by said number of sectors, when said format data is written at said consecutive plural sector addresses.

Entry (13) A data recording method for use in a storage device which writes data from and reads data to information processing means, for recording sector-sized data on at least one storage medium, said sector-sized data being formed by combining data having a size smaller than a sector size and format data, said data recording method comprising the step of:

receiving format data necessary to format said storage medium and storing said format data in storing means for each pattern;

receiving a sector address specifying a sector of said storage medium to be written, a pattern identifier specifying a pattern of said format data to be written, said data having a size smaller than the sector size, and a data size of said data;

reading from said storing means said format data having said pattern corresponding to said pattern identifier; and writing said data having said data size in the sector of said storage medium corresponding to said received sector address, and said read format data in a portion of said sector where said data is not written.

Entry (14) The data recording method according to Entry 13, wherein said storage device constitutes a RAID system comprising a plurality of storage media, in which said receiving step, said reading step and said writing step are repeated to write data into the plurality of storage media.

Entry (15) A computer readable program for use in a storage device which writes data from and reads data to information processing means, for formatting at least one storage medium, said program executing the step of:

receiving format data necessary to format said storage medium and storing said format data in storing means for each pattern;

receiving a sector address specifying a sector of said storage medium to be written, and a pattern identifier specifying a pattern of said format data to be written;

reading from said storing means said format data having said pattern corresponding to said pattern identifier; and writing said read format data in the sector of said storage medium corresponding to said received sector address.

Though this invention has been described above by way of example using the accompanying drawings, this invention is not limited to the described embodiments, In this invention, even when a plurality of storage media are provided, the cache, the interface and the controller may be provided singly, or plurally as needed. Also, the formatting method and the data recording method of this invention may be configured as a program for executing the process as shown in FIGS. 10 to 12, and this program may be stored in the storage medium and called as needed.

DESCRIPTION OF SYMBOLS

10, 100 . . . Storage device

20 . . . Information processing means

30, 110 . . . Control means

32, 106 . . . Cache or storing means

34, 102 . . . Interface or receiving means

36, 104 . . . Controller or writing means

40 to 99, 200 to 259 . . . Storage media

What is claimed is:

1. A storage device, comprising:

a storage medium;

a cache;

an interface configured to receive a first pattern identifier and corresponding first format data having a first pattern, and to receive a second pattern identifier and corresponding second format data having a second pattern; and a controller coupled to the storage medium, the cache, and to the interface, wherein the controller is configured to perform the following operations:

calculating a first memory address in the cache corresponding with the first pattern identifier;

writing the first format data at the calculated first memory address;

calculating a second memory address in the cache corresponding with the second pattern identifier; and writing the second format data at the calculated second memory address;

whereby a plurality of patterns of format data are written in the cache.

2. The storage device of claim 1, wherein each storage medium is a hard disk drive.

3. The storage device of claim 1:

wherein the interface is further configured to receive a sector address indicating a sector of the storage medium, and to receive a pattern identifier specifying one of the plurality of patterns of format data to be written to the sector; and wherein the controller is further configured to perform the following operations:

reading the specified one of the plurality of patterns of format data from the cache; and writing the format data read from the cache into the sector of the storage medium corresponding with the sector address.

4. The storage device of claim 3:

wherein the interface is further configured to perform the operation of receiving a number indicating the number of sectors to be formatted, when consecutive sectors are to be formatted, and wherein the controller is further configured to perform the following operations:

determining whether format data has been written in the number of sectors to be formatted, and if not:

specifying a next consecutive sector address;

reading the specified one of the plurality of patterns of format data from the cache; and writing the format data read from the cache into the sector of the storage medium corresponding with the next consecutive sector address.

5. The storage device of claim 1:

wherein the interface is further configured to perform the operation of receiving data other than format data having a data size smaller than a sector size to be written, an indicator of the size of the data other than format data, a pattern identifier, and a sector address;

and wherein the controller is further configured to perform the following operations:

writing the data other than format data at the sector address;

reading format data corresponding with the specified one of the plurality of patterns of format data from the cache; and writing the format data read from the cache in a portion of the sector where the data other than format data is not written.

6. An information processing system, comprising:

at least one storage medium in a storage device;

a cache;

an interface configured to receive a first pattern identifier and corresponding first format data having a first pattern, and to receive a second pattern identifier and corresponding second format data having a second pattern, to be written to the caches, wherein the first pattern and the second pattern define a plurality of patterns of format data to be written to the cache; and a host computer coupled to the interface, wherein the host computer is configured to perform the following operations;

receiving a formatting request from a user;

selecting a pattern of format data to transfer and a pattern number corresponding with a memory address in the cache in which the format data to be transferred is to be stored wherein format data to be transferred is one of the plurality of patterns of format to be written to the cache;

receiving a notification indicating that the storage device is ready; and transferring the selected format data and pattern number to the interface; and a controller coupled to the cache, the interface, and to each storage medium, wherein the controller is configured to perform the following operations:

calculating a memory address in the cache corresponding with the selected pattern number; and writing the selected pattern of format data at the calculated memory address.

7. The information processing system of claim 6:

wherein the interface is further configured to receive a sector address indicating a sector of a storage medium in the at least one storage medium, and to receive a pattern identifier specifying one of the plurality of patterns of format data to be written to the sector; and wherein the controller is further configured to perform the following operations:

reading the specified one of the plurality of patterns of format data from the cache; and writing the format data read from the cache into the sector corresponding with the sector address.

8. The information processing system of claim 7, wherein the controller is further configured to perform the following operations:

specifying a next consecutive sector address;

reading the specified one of the plurality of patterns of format data from the cache; and writing the format data corresponding with the pattern identifier into a sector corresponding with the next consecutive sector address.

9. The information processing system of claim 6, wherein the at least one storage medium includes at least one hard disk drive.

10. A storage device, comprising:

a plurality of storage mediums;

a cache;

an interface configured to receive a sector address specifying a sector of one of the storage mediums in the plurality of storage mediums to be written with format data, and to receive a pattern identifier specifying a pattern of format data to be written to the sector; and a controller coupled to the cache, the interface, and to the plurality of storage mediums, wherein the controller is configured to perform the following operations:

storing a plurality of patterns of the format data, wherein each pattern of format data is stored in a respective memory address in the cache;

reading from the cache, the format data having the pattern corresponding with the pattern identifier, wherein the format data having the pattern corresponding with the pattern identifier is one of the plurality of patterns of format data stored in the cache; and writing the format data having the pattern corresponding with the pattern identifier into the sector of the storage medium corresponding wit the received sector address.

11. The storage device of claim 10, wherein the controller is further configured to perform the operation of calculating the memory address in the cache corresponding with the pattern identifier; and wherein the operation of reading from the cache comprises reading the format data having the pattern corresponding with the pattern identifier beginning at the calculated memory address.

12. The storage device of claim 11, wherein the plurality of storage mediums are coupled to the cache, and wherein each storage medium is a hard disk drive.

13. A storage device, comprising:

a storage medium;

means for storing a plurality of patterns of format data, wherein each pattern of format data is stored beginning at a respective memory addresses, and wherein the means for storing is coupled to the storage medium;

means for receiving a sector address specifying a sector of the storage medium to be written with format data, and for receiving a pattern identifier specifying a pattern of the format data to be written to the sector, wherein the pattern of the format data to be written to the sector is one of the plurality of patterns of format data;

means for reading from the means for storing, the format data having a pattern corresponding with the pattern identifier; and means for writing the format data having the pattern corresponding with the pattern identifier into the sector of the storage medium corresponding with the received sector address; and wherein the means for reading and the means for writing are coupled to the means for receiving and the means for storing.

14. A storage device for writing data from and reading data to information processing means, comprising:

at least one storage medium;

means for storing a plurality of patterns of format data, wherein a plurality of patterns of format data is stored in the means for storing;

means for receiving a sector address specifying a sector of a storage medium in the at least one storage medium to be written to, and a pattern identifier specifying a pattern of the format data to be written stored in the means for storing, wherein the specified pattern of the format data to be written is selected from the plurality of patterns of format data; and means for reading the format data having the pattern corresponding with the pattern identifier from the storing means and writing the read format data into the sector of the storage medium corresponding with the received sector address; and wherein the means for reading the format data is coupled to the at least one storage medium, the means for storing a plurality of patterns of format data, and the means for receiving a sector address.

15. The storage device according to claim 14, wherein the at least one storage medium includes a RAID system having a plurality of storage media.

16. The storage device according to claim 14, wherein the means for writing the read format data is configured to write data other than format data into the sector at the sector address, wherein the data other than format data has a data size that is smaller than the sector, and wherein the means for writing the read format data is also configured to write the format data in a portion of the sector where the data other than format data is not written.

17. A computer program embodied in a computer readable medium, for formatting at least one storage medium, the program comprising the following operations:

receiving a plurality of patterns of format data;

storing each pattern of format data received, beginning at a corresponding memory address in a memory;

receiving a sector address specifying a sector of a storage medium to be written to, and a pattern identifier specifying a pattern of the format data to be written to the sector;

reading from the memory the format data having the pattern corresponding with the pattern identifier; and writing the format data read from the memory, to the sector of the storage medium corresponding with the received sector address.

18. The computer program of claim 17, wherein the operations farther comprise writing the read format data to a plurality of sectors of the storage medium.

19. A computer program embodied in a computer readable medium, for recording on at least one storage medium, the program comprising the following operations:

receiving a plurality of patters of format data;

storing each pattern of format data received, beginning at a corresponding memory address in a memory;

receiving a sector address specifying a sector of a storage medium to be written to, and a pattern identifier specifying a pattern of the format data to be written to the sector, and data other than format data having a size smaller than the sector, and an indicator of the size of the data other than format data;

writing the data other than format data in the sector of the storage medium corresponding with the received address;

reading from the memory the format data having the pattern corresponding with the pattern identifier; and writing the format data read from the memory, in a portion of the sector of the storage medium corresponding with the received sector address, wherein the portion of the sector is where the data other than format data is not written in the sector.

20. A method for formatting at least one storage medium for use in a storage device that writes data from and reads data to a host computer, the method comprising the following operations:

receiving a plurality of patterns of format data for formatting the at least one storage medium;

storing each pattern of format data in a corresponding memory address in a memory;

receiving a sector address specifying a sector of a storage medium to be written to, and a pattern identifier specifying a pattern of the format data to be written;

reading from the memory the format data having the pattern corresponding with the pattern identifier; and writing the read format data in the sector of the storage medium corresponding with the received sector address.

21. The method for formatting according to claim 20, wherein the storage device constitutes a RAID system comprising a plurality of storage media, and wherein the receiving operation, the reading operation, and the writing operation are repeated for each of the storage media in the plurality of storage media.

22. A method for recording format data and data other than format data on a storage medium, the method comprising the following operations:

receiving a plurality of patterns of format data;

storing each pattern of format data received, beginning at a corresponding memory address in a memory;

receiving a sector address specifying a sector of the storage medium to be written, and a pattern identifier specifying a pattern of the format data to be written to the sector, and data other than format data having a size smaller than the sector, and an indicator of the size of the data other than format data;

reading from the memory the format data having the pattern corresponding with the pattern identifier;

writing the data other than format data in the sector of the storage medium corresponding with the received address; and writing the format data read from the memory, in a portion of the sector of the storage medium corresponding with the received sector address, wherein the portion of the sector is where the data other than format data is not written in the sector.

23. A method for formatting a storage medium, comprising the following operations:

receiving a formatting request from a user;

receiving a notification indicating that a storage device is ready;

storing a plurality of patterns of format data in respective addresses in a cache;

receiving at a storage system a sector address specifying a sector of the storage medium to be written and a pattern identifier specifying a pattern of the format data to be written;

reading from the cache format data having the pattern corresponding with the pattern identifier; and writing the read format data in the sector of the storage medium corresponding with the received sector address.

24. A method for formatting a plurality of storage mediums, comprising the following operations:

receiving at a storage device, first format data necessary to format a first storage medium;

receiving at the storage device, a first pattern number corresponding with the first format data;

storing the first format data in a cache of the storage device;

writing the first format data in all of the sectors of the first storage medium;

receiving at the storage device, second format data necessary to format a second storage medium;

receiving at the storage device, a second pattern number corresponding with the second format data;

storing the second format data in the cache of the storage device; and writing the second format data in all of the sectors of the second storage medium.

* * * * *